(12) United States Patent
Harrison-Griffin et al.

(10) Patent No.: US 7,000,535 B2
(45) Date of Patent: Feb. 21, 2006

(54) CULINARY PRESS

(75) Inventors: Anthony Harrison-Griffin, Badminton (GB); Robin Levien, London (GB)

(73) Assignee: Maxpat Trading & Marketing (Far East) Ltd., Hong Kong (HK)

( * ) Notice: Subject to any disclaimer, the term of this patent is extended or adjusted under 35 U.S.C. 154(b) by 63 days.

(21) Appl. No.: 10/688,814

(22) Filed: Oct. 17, 2003

(65) Prior Publication Data

US 2004/0134362 A1    Jul. 15, 2004

(30) Foreign Application Priority Data

Oct. 18, 2002  (GB) .................................. 0224327

(51) Int. Cl.
  *B30B 9/02* (2006.01)
(52) U.S. Cl. .................. 100/126; 100/234; 100/243
(58) Field of Classification Search ................ 100/110, 100/112, 126, 125, 130, 234, 243, 116; 99/504, 99/505, 510; D7/665, 666
See application file for complete search history.

(56) References Cited

U.S. PATENT DOCUMENTS

| | | | | |
|---|---|---|---|---|
| 2,776,616 A | * | 1/1957 | Sarossy | ............... 100/234 |
| 5,101,720 A | * | 4/1992 | Bianchi | ................ 100/99 |
| 5,463,941 A | | 11/1995 | Gibson | ................ 99/495 |
| 6,109,170 A | * | 8/2000 | Short et al. | ........... 99/510 |
| 6,505,548 B1 | * | 1/2003 | Lillelund et al. | ...... 99/510 |

FOREIGN PATENT DOCUMENTS

GB    2 355 921 A    5/2001

* cited by examiner

*Primary Examiner*—Derris H. Banks
*Assistant Examiner*—Shelley Self
(74) *Attorney, Agent, or Firm*—Renner, Kenner, Greive, Bobak, Taylor & Weber

(57) ABSTRACT

A culinary press comprises first and second elongate members (4,6) pivotably connected to each other near a pressing end at a first pivot point (8), the first member (4) at least in part defining a food receiving chamber (9), and with a perforated surface provided against which forced to be crushed is pressed, and a pivotably mounted plunger (30) disposed between the elongate members to be pivotable about a second pivot point (28) into said chamber (9), wherein the plunger is mounted so that the second pivot point (28) is disposed on the opposite side or the first pivot point from the chamber (9), and wherein the second elongate member (6) is formed with an actuating finger (16) which bears on the plunger (30).

17 Claims, 5 Drawing Sheets

CULINARY PRESS

BACKGROUND OF THE INVENTION

The present invention relates to a culinary press and particularly, although not exclusively, to a press used for crushing garlic.

Garlic presses are well-known and can take a variety of forms. In one popular form the press comprises two pivotably connected members having handles extending therefrom one of which defines at one end a chamber into which a garlic clove is placed with a perforated surface at the bottom of the chamber, and the other of which is provided with a plunger portion which extends into the chamber. When the handles are brought together the garlic clove is crushed and forced through the perforated surface. In one particular form of press the perforated surface is formed as separate element pivotably connected to the member defining the chamber, to allow for ease of access to its interior surface for cleaning purposes.

Of particular importance with such hand operated devices is ease of use. Many known presses are difficult to use effectively requiring significant force to be applied which is particularly difficult for the elderly or infirm.

SUMMARY OF THE INVENTION

In a first aspect the present invention seeks to provide a press with which it is easy to apply sufficient operating force.

According to a first aspect of the present invention there is provided a culinary press comprising first and second elongate members pivotably connected to each other near a pressing end at a first pivot point, the first member at least in part defining a food receiving chamber, and with a perforated surface provided against which food to be crushed in pressed, and a pivotably mounted plunger disposed between the elongate members to be pivotable about a second pivot point into said chamber, wherein the plunger is mounted so that its second pivot point is disposed on the opposite side of the first pivot point from the majority of the chamber, and wherein the second elongate member is formed with an actuating surface which bears on the plunger, whereby the actuating surface bears on the plunger at a position increasingly distant from the second pivot point on progressive closing as food is being crushed.

Such a structure means that on progressive crushing the region on the plunger on which the actuating surface bears progressively moves away from the plunger's pivot, increasing the mechanical advantage of the press, and decreasing the force required to crush a given food item. Thus, the press is particularly easy to use for those of limited strength. It also allows larger amount of food to be crushed in any single crushing action.

Although described below in relation to a press particularly for crushing garlic, the invention has wider applicability for example for other types of culinary presses such as potato ricers, fruit presses, nut crackers and similar items.

The second pivot point is preferably disposed at a forward end of the chamber, and with the first pivot point disposed between about one third and one half of the distance along the chamber from its forward ends. In a preferred embodiment the spacing is about four tenths of the distance from the front of the chamber.

In the preferred embodiment the plunger has an upper surface remote from its pivot which has a generally planar surface, and adjacent its pivot defines a recessed region. This recessed region is important for receiving the actuator surface when the press is opened out so that the plunger can be pivoted fully out of the chamber allowing easy access to the perforated surface for cleaning purposes.

The actuating surface is preferably defined on an actuator finger which actuator finger is fixed to an underside of the second elongate member. This provides a very simple, yet perfectly effective means for bearing on the plunger.

A further difficulty with conventional presses is that there is a tendency for the garlic which has been crushed against the perforated surface to adhere to both the upper side of the perforated surface and the plunger so that these have a tendency to stick together, making access to the perforated surface after use more difficult. The present invention seeks to provide a structure which overcomes this problem.

According to a second aspect of the present invention there is provided a culinary press comprising first and second elongate members pivotably connected to each other near a pressing end, the first member at least in part defining a food-receiving chamber with a perforated surface provided against which food to be crushed is pressed, and a pivotably-mounted plunger disposed between the elongate members to be pivotable into saint chamber towards the perforated surface, the second elongate member being adapted to act on the plunger on one side of its pivot to move the plunger towards the perforated surface, and wherein the second elongate member is further adapted to act on the plunger on the opposite side of its pivot as the first and second members are moved apart on opening of the press in order to drive the plunger out of the chamber.

Such a structure prevents the plunger from adhering to the perforated surface through the crushed foodstuff, and allows the user access to the chamber and the upper side of the perforated surface so that any remaining foodstuffs can be readily removed.

The second elongate member is preferably formed with an actuator which on opening of the press engages means provided on the plunger, which actuator may make a variety of forms, in a preferred form comprising a bent protrusion defining an edge which engages said means on the plunger.

In a preferred embodiment the first and second elongate members are pivotably connected at a position spaced from the said means on the plunger and arranged such that said actuator moves in an arc which intersects said means on the plunger.

The means on the plunger may comprise a groove formed in the plunger which receives the actuator.

The second member may be formed with a cutout region with said actuator extending into the cutout and being spaced from said means of the plunger to allow a degree of relative pivoting apart of the first and second members before the actuator engages the plunger, typically in the region of 90° of relative pivoting in the opening direction before the actuator engages the plunger. Moreover, the plunger is pivotably mounted at a position closely adjacent the region of the plunger with the groove such that after a predetermined rotation of the plunger as it is driven by the actuator, the actuator escapes from the groove such that on continued opening the rotation the plunger is no longer driven by the actuator, preferably within the region of 50° of pivoting before the actuator leaves the grooves.

The perforated surface may be formed in a separate bent strip pivotably joined to the first elongate member and forming at least a bottom region of said chamber.

BRIEF DESCRIPTION OF THE DRAWINGS

Embodiments of the invention will now be described, by way of example only, with reference to the following drawings in which.

DETAILED DESCRIPTION OF THE PREFERRED EMBODIMENTS

Figure 1:
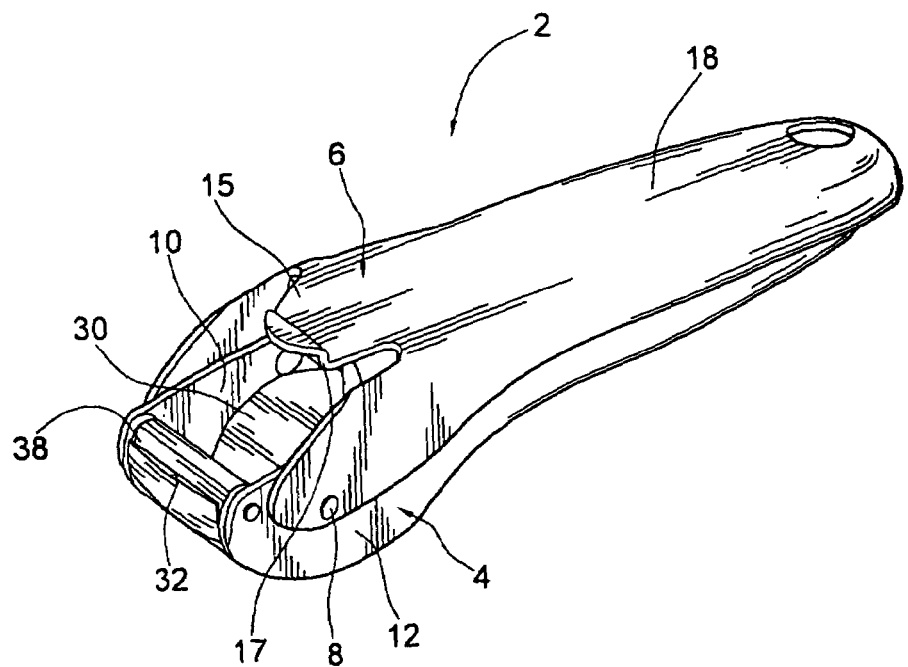
FIG. 1 is a perspective view of a culinary press in accordance with an embodiment of the invention in a closed position.

With reference to the drawings, the culinary press in accordance with the first embodiment of the invention is generally designated 2 and comprises first and second members 4, 6 pivotably connected together by means of a pin 8 which extends through aligned apertures near ends of respective members 4, 6 at which pressing takes place. The first member 4 has a body which defines in part a food-receiving chamber 9 between opposed sidewall regions 10, 12 and includes a first handle 14 extending therefrom.

The second member 6 is provided near the end thereof to which it is pivotably connected to the first member 4 with a cutout region defining a tongue 15 on the upper surface as best seen in FIG. 1. The tongue 15 is formed with a bent end region defining an actuating nose 17. On the underside of the second member 6 is an actuating finger 16 which is secured to or unitarily formed therewith. A handle portion 18 extends rearwardly from the second member 6.

Figure 6:
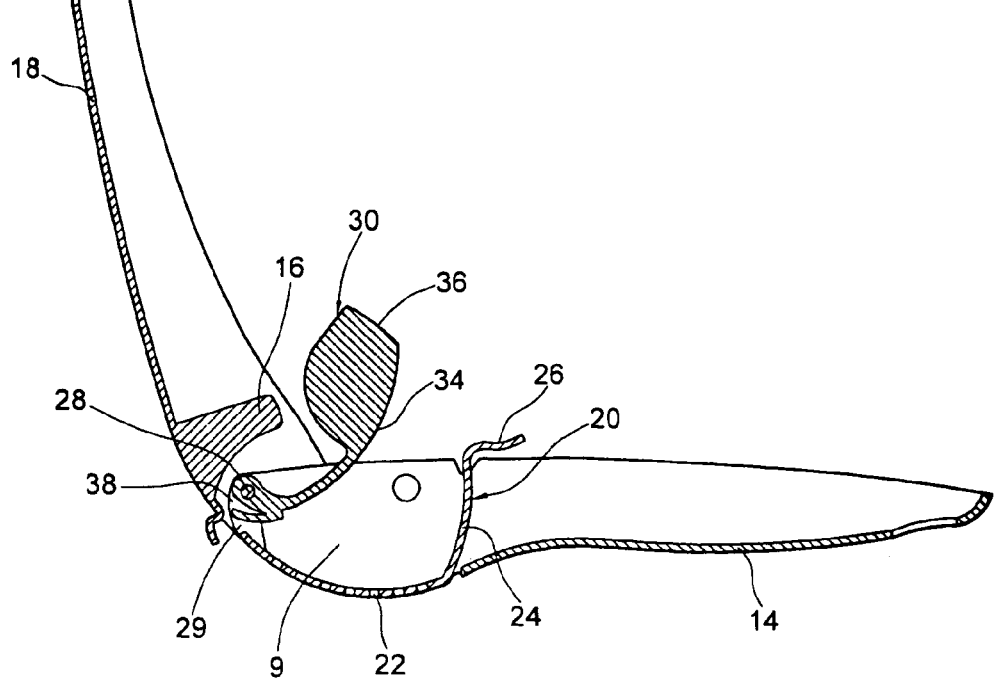
FIG. 6 is a cross-sectional view in a slightly more opened out condition with the actuator just disengaged from the plunger.

Pivotably mounted between the first and second members 4, 6 there is provided a perforated plate 20 having an arcuate perforated surface 22 of length greater than its width, joined to an upstanding end wall 24 and a bent over lip 26 as best seen in FIG. 6. An upper region of the end wall 24 is of slightly greater lateral dimension than the distance between the sidewalls 10, 12 forming a shoulder, whilst there are small cutouts 27 in the sidewalls 10, 12 into which the shoulders sit, limiting the downward movement of the plate 20. The sidewalls 10, 12 of the first member 4 and the perforated surface 22 and the plate end wall 24 together define the chamber 9 into which garlic or other foodstuff to be crushed is placed. At the opposite end of the plate 20 a pair of upstanding legs 29 are provided through which a pivot pin 28 extends, by which the plate 20 is secured to the first member 4.

Also pivotably mounted so as to lie between the first and second members 4, 6 is a plunger 30 which can pivot into and out of the chamber with its pivot point arranged at or near a forward end of the chamber 9. A forward end region 32 of the plunger has a lateral opening therethrough, through which the pin 28 extends, whereby its pivot is coincident with that of the perforated plate 22. At the region of the plunger 30 remote from its pivot with the upper surface defines an upwardly concave surface defining a shoulder 31 joining a generally planar top region 33. The plunger 30 is provided with an arcuate underside 34 and end region 36 conforming to the shape of the perforated surface 22 and end wall 24 respectively. At the forward end region 32 the plunger 30 is formed with a laterally extending groove 38, which on opening of the handles receives the actuating nose 17 of the tongue 15 as is discussed below. The plunger 30 also defines on its upper surface adjacent its pivot, a recess which is important for allowing the plunger 30 to be fully pivoted out of the chamber 9, to allow for cleaning of the perforated surface.

Figure 7:
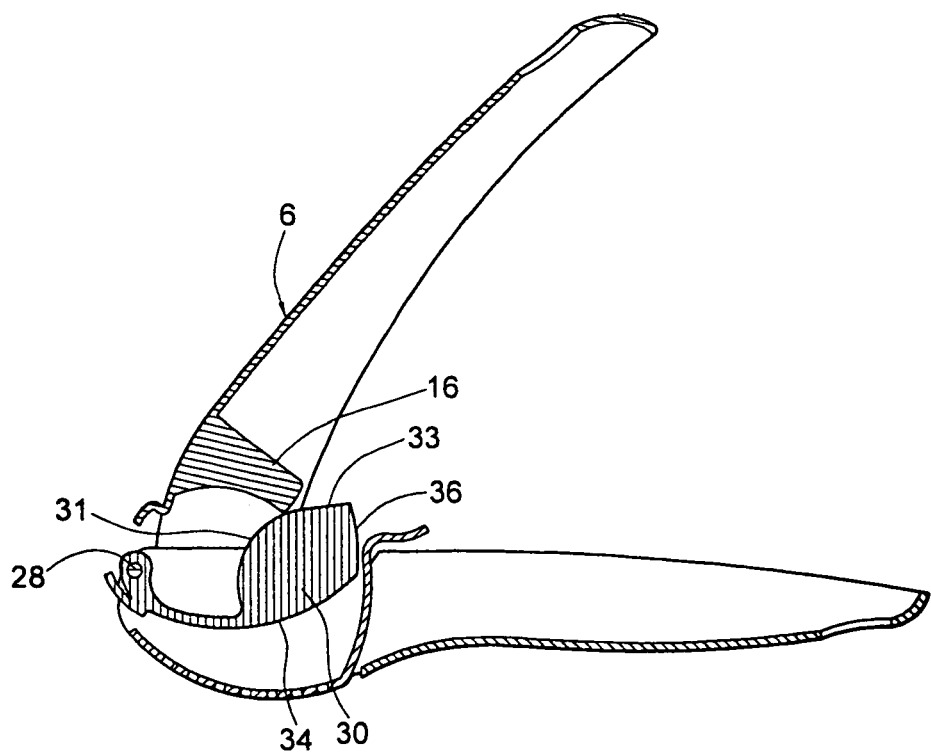
FIG. 7 is a cross-sectional view in a more closed condition during food crushing.
Figure 8:
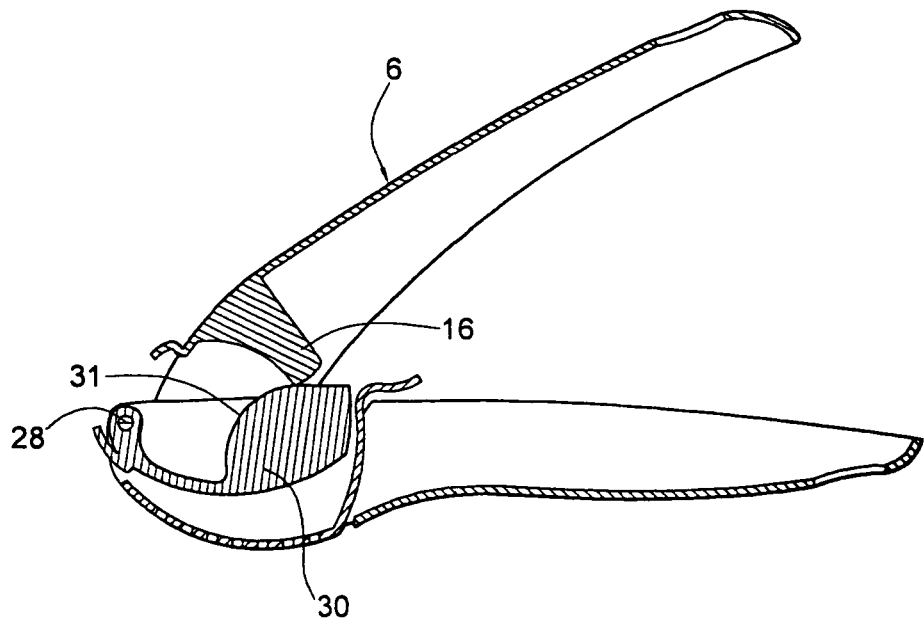
FIG. 8 is a cross-sectional view in a still more closed condition.
Figure 9:
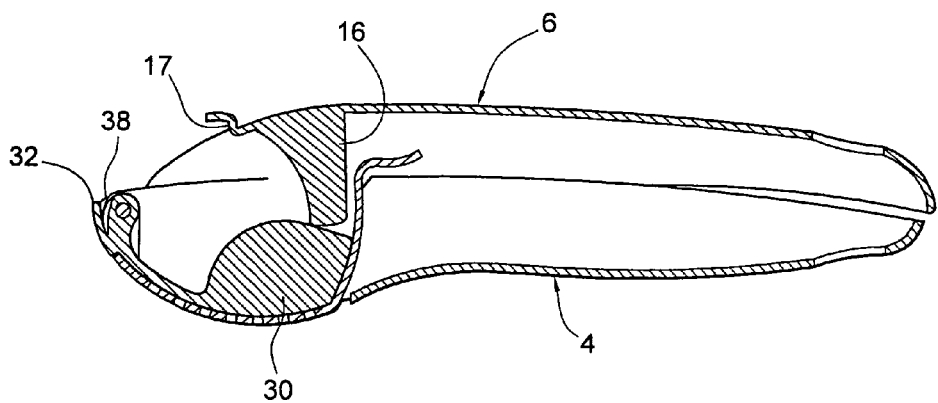
FIG. 9 is a cross-sectional view in a fully closed condition.

In use, the members 4 and 6 are first pivoted into the open position illustrated in FIG. 6 or to a position more open than this. An item of foodstuff such as a garlic clove to be crushed is placed within the chamber 9 on the upper side of the perforated surface 22. The handles 14, 18 are then pivoted together so that the actuating finger 16 engages the upper surface of the plunger initially at or near the shoulder region 31, forcing it into the chamber 9 and starting to crush the foodstuff through the perforated surface 22 from where it emerges on the underside thereof. Further closing of the handles brings the press 2 through the positions shown in FIG. 7 and FIG. 8 where it will be noted that the actuating finger 16 is progressively riding up and along the upper surface 33 of the plunger 30, with the foodstuff being progressively forced through the perforated surface. It will further be appreciated that it is essentially the relative dispositions of the pivot points of the actuating finger 16 (or rather that of the upper member 6 on which the finger is mounted) and the pivot for the plunger 30 which is disposed on the opposite side of the actuating finger pivot 6 from the chamber or at least the majority of the chamber, which effects this movement of the position at which the force is applied to the plunger. Thus, the upper surface of the plunger 30 is acting somewhat in the manner or a cam surface, with the point at which force is applied to the plunger 30 moving progressively further from the plunger pivot, and thereby increasing the mechanical advantage of the press, and decreasing the required crushing force. The fully closed portion is shown in FIG. 9.

The actuating finger pivot 8 is preferably arranged between about one third and one half of the distance along the chamber from the front (more particularly from the plunger pivot point). If the pivot points are too close there is little increase in mechanical advantage on progressive crushing, whereas if they are too far apart the shape and dimension of the upper member to accommodate this would be unwieldy. In the preferred embodiment as illustrated the pivot points are spaced by about four tenths of the chamber length.

Figure 2:
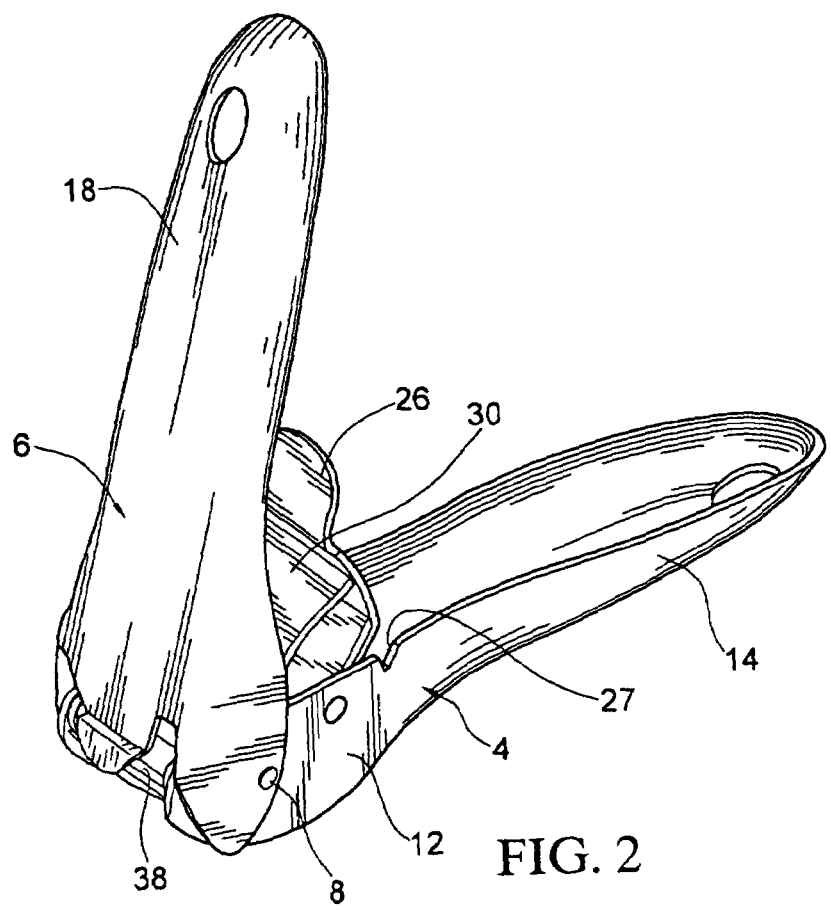
FIG. 2 is a perspective view of the culinary press with the handles partly opened.
Figure 3:
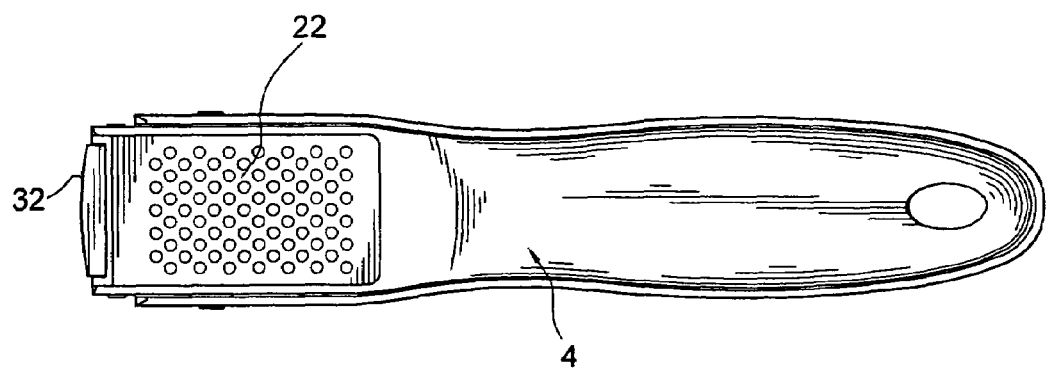
FIG. 3 shows the press from below when closed.
Figure 4:
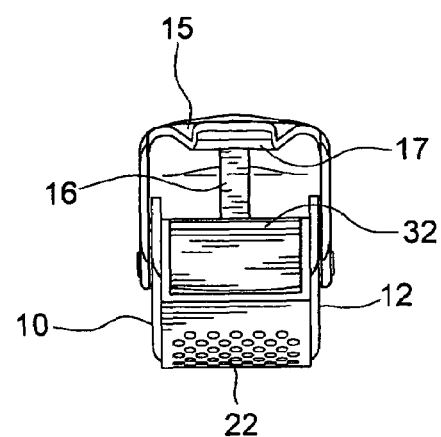
FIG. 4 shows the press from the front when closed.
Figure 5:
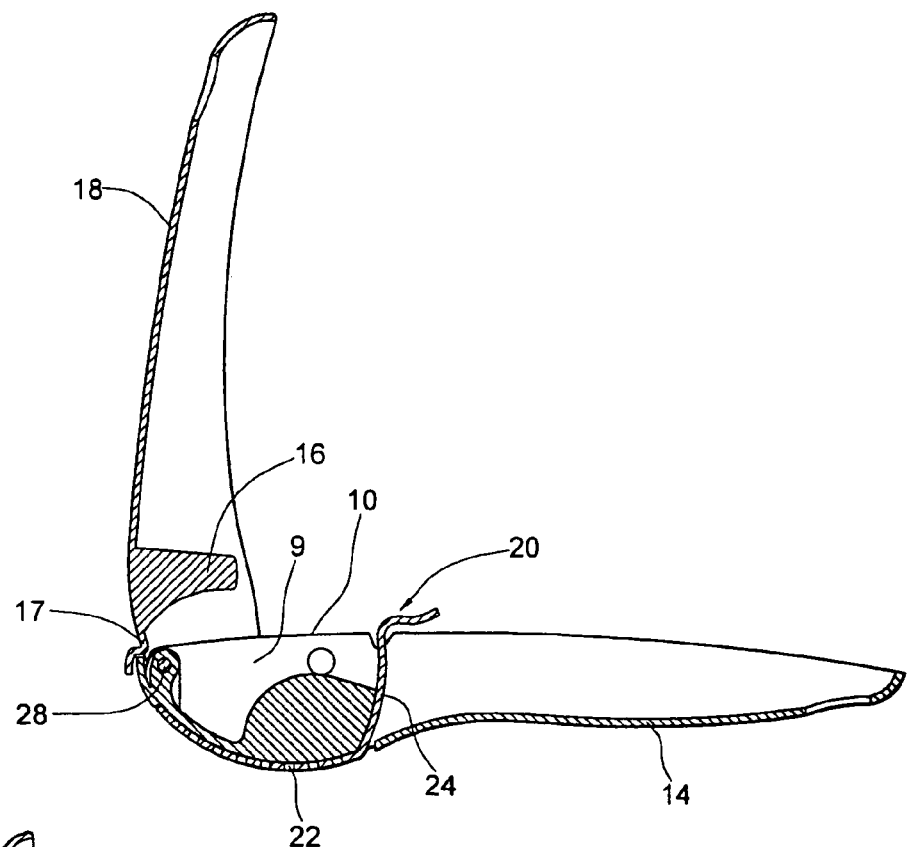
FIG. 5 is a cross-sectional view in a partly opened out condition with the plunger just engaged by an actuator.

After use the handles 14, 18 are moved apart, the tongue 15 moving towards the forward end of the plunger, its actuating nose 17, specifically the forward-facing edge, engaging in the groove 38 at a position where the handles are pivoted at about 90° to each other, as illustrated in FIGS. 2 and 5. As the handles 14, 18 are moved further apart the plunger 30 is driven by the tongue 15 to rotate in an anticlockwise sense as shown in FIG. 5, out or the chamber. This thereby allows the user access to the upper surface of the perforated plate 22 so as to easily remove any crushed foodstuff remaining in the chamber 9. In view of the relative positions of the respective pivot points of the members 4, 6 as compared to the pivot of the plunger 30 a small rotational movement of the tongue 15 effects a large rotational movement of the plunger 30. The tongue 15 is moving in a relatively flat arc, and after a relatively small further angular displacement the forward end region 32 of the plunger has rotated such that the actuating nose 17 disengages from the groove 38 and moves over and past the forward end 32 of the plunger as indicated in FIG. 6, such that the plunger 30 is free to be pivoted manually further open or to fall back into the chamber 9 as desired.

It will be appreciated that a wide variety of different shapes of actuating surface on the second member 6 and engagement means on plunger are possible. In alternative arrangements, instead of providing a lateral groove 38 in the forward end of the plunger 30, there can be provided a forwardly extending abutment surface as a flat top to the forward region of the plunger adjacent the pivot, or as a step or as a forwardly protruding cab, in each case an actuating formation on second member 6 abutting the surface or other adaptation on opening of the press 2 to drive the plunger 30 out of the chamber.

What is claimed is:

1. A culinary press comprising first and second elongate members pivotably connected to each other near a pressing end at a first pivot point, the first member at least in part defining a food receiving chamber, and with a perforated surface provided against which food to be crushed is pressed, and a pivotably mounted plunger disposed between the elongate members to be pivotable about a second pivot point into said chamber, wherein the plunger is mounted so that its second pivot point is disposed on the opposite side of the first pivot point from the majority of the chamber, and wherein the second elongate member is formed with an actuating surface which bears on the plunger, whereby the actuating surface bears on the plunger at a position increasingly distant from its pivot on progressive closing as food is being crushed.

2. A culinary press according to claim 1 wherein the second pivot point is disposed at a forward end of the chamber.

3. A culinary press according to claim 2 wherein the first pivot point is disposed between one third and one half of the distance along the chamber from the forward end of the chamber.

4. A culinary press according to claim 3 wherein the first pivot point is disposed at about four tenths of the distance along the chamber.

5. A culinary press according to claim 1 wherein the plunger has an upper surface remote from its pivot which has a generally planar surface.

6. A culinary press according to claim 1 wherein the plunger has an upper surface which, adjacent its pivot, defines a recessed region.

7. A culinary press according to claim 1 wherein the actuating surface is defined on an actuating finger fixed to an underside of the second elongate member.

8. A culinary press comprising first and second elongate members pivotably connected to each other near a pressing end, the first member at least in part defining a food receiving chamber and with a perforated surface provided against which food to be crushed is pressed, and a pivotably plunger mounted disposed between the elongate members to be pivotable into said chamber towards the perforated surface, the second elongate member being adapted to act on the plunger on one side of its pivot to move the plunger towards the perforated surface, and wherein the second elongate member is further adapted to act on the plunger on the opposite side of its pivot as the first and second members are moved apart on opening of the press in order to drive the plunger out of the chamber.

9. A culinary press according to claim 8 wherein the second elongate member is formed with an actuator which on opening of the press engages means provided on the plunger.

10. A culinary press according to claim 9 wherein the actuator comprises a bent protrusion defining an edge which engages said means on the plunger.

11. A culinary press according to claim 9 wherein the first and second elongate members are pivotably connected at a position spaced from the said means on the plunger and arranged such that said actuator moves in an arc which intersects said means on the plunger.

12. A culinary press according to claim 9 wherein said means provided on the plunger comprise a groove formed in the plunger which receives said actuator.

13. A culinary press according to claim 8 wherein the second member is formed with a cutout region with said actuator extending into the cutout and being spaced from said means of the plunger to allow a degree of relative pivoting apart of the first and second members before the actuator engages the plunger.

14. A culinary press according to claim 13 wherein the actuator is spaced from said means on the plunger by a distance sufficient to allow about 90° of relative pivoting in the opening direction before the actuator engages the plunger.

15. A culinary press according to claim 12 wherein the plunger is pivotably mounted at a position closely adjacent the region of the plunger with the groove such that after a predetermined rotation of the plunger as it is driven by the actuator, the actuator escapes from the groove such that on continued opening the rotation the plunger is no longer driven by the actuator.

16. A culinary press according to claim 15 wherein it is arranged that the plunger is pivotably driven through an angle of about 50° before the actuator leaves said groove.

17. A culinary prefix according to claim 9 wherein the perforated surface is formed in a separate bent strip pivotably joined to the first elongate member and forming at least a bottom region or said chamber.

* * * * *